United States Patent
Zwanzger

(10) Patent No.: US 11,807,295 B2
(45) Date of Patent: Nov. 7, 2023

(54) STEERING APPARATUS FOR AN AGRICULTURAL VEHICLE

(71) Applicant: DEERE & COMPANY, Moline, IL (US)

(72) Inventor: Matthias Zwanzger, Nuremberg (DE)

(73) Assignee: DEERE & COMPANY, Moline, IL (US)

( * ) Notice: Subject to any disclaimer, the term of this patent is extended or adjusted under 35 U.S.C. 154(b) by 312 days.

(21) Appl. No.: 16/832,428

(22) Filed: Mar. 27, 2020

(65) Prior Publication Data

US 2020/0317264 A1    Oct. 8, 2020

(30) Foreign Application Priority Data

Apr. 2, 2019 (DE) .......................... 102019204674.6

(51) Int. Cl.
| | |
|---|---|
| B62D 5/26 | (2006.01) |
| B62D 6/00 | (2006.01) |
| B62D 15/02 | (2006.01) |
| B62D 11/00 | (2006.01) |

(52) U.S. Cl.
CPC .............. B62D 11/005 (2013.01); B62D 5/26 (2013.01); B62D 6/001 (2013.01); B62D 15/021 (2013.01)

(58) Field of Classification Search
CPC .......... B62D 11/005; B62D 5/26; B62D 6/00; B62D 15/021
See application file for complete search history.

(56) References Cited

U.S. PATENT DOCUMENTS

| | | | | |
|---|---|---|---|---|
| 2013/0033011 A1* | 2/2013 | Pfiffner | .................... | B62D 9/00 |
| | | | | 280/5.514 |
| 2017/0188505 A1* | 7/2017 | Potier | .................. | G05D 1/0221 |
| 2018/0170420 A1* | 6/2018 | Weber | .................. | B62D 5/0463 |

FOREIGN PATENT DOCUMENTS

| | | | | |
|---|---|---|---|---|
| EP | 1847897 A2 * | 10/2007 | ........... | A01B 69/008 |
| EP | 2042407 A2 * | 4/2009 | ............... | B60G 9/00 |
| EP | 2042407 A2 | 4/2009 | | |
| EP | 2886419 A2 | 6/2015 | | |
| EP | 3339137 A1 | 6/2018 | | |

OTHER PUBLICATIONS

Darr, Matthew"CAN Bus Technology Enables Advanced Machinery Management" Resource Magazine, vol. 19, No. 5published Sep. 1, 2012. (Year: 2012).*
Translation of EP2042407A2 performed by EspaceNet on Oct. 19, 2022 (Year: 2022).*
European Search Report issued in counterpart application No. 20164615.5 dated Aug. 26, 2020 (08 pages).

* cited by examiner

*Primary Examiner* — Jeff A Burke
*Assistant Examiner* — Joshua Alexander Garza

(57) ABSTRACT

A steering apparatus for an agricultural vehicle includes a vehicle axle suspended in an oscillating or resilient manner, steerable wheels located on the vehicle axle, and an actuating apparatus for influencing a steering angle which is adjustable on the steerable wheels. A device actively limits an oscillating angle or deflection path arising on the vehicle axle. Moreover, the device operably activates a control unit according to a full steering angle to be anticipated on the steerable wheels as a result of travel.

12 Claims, 1 Drawing Sheet

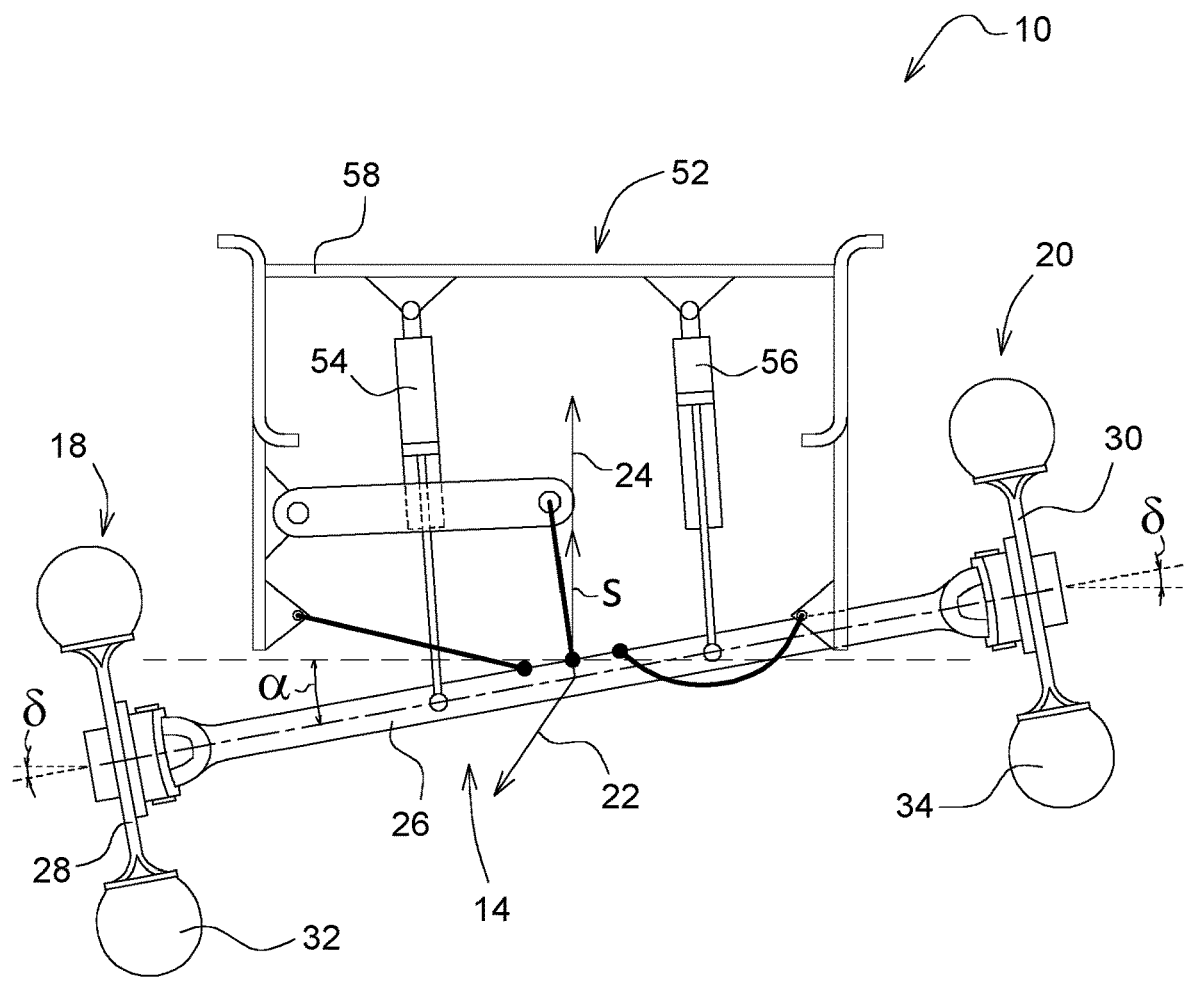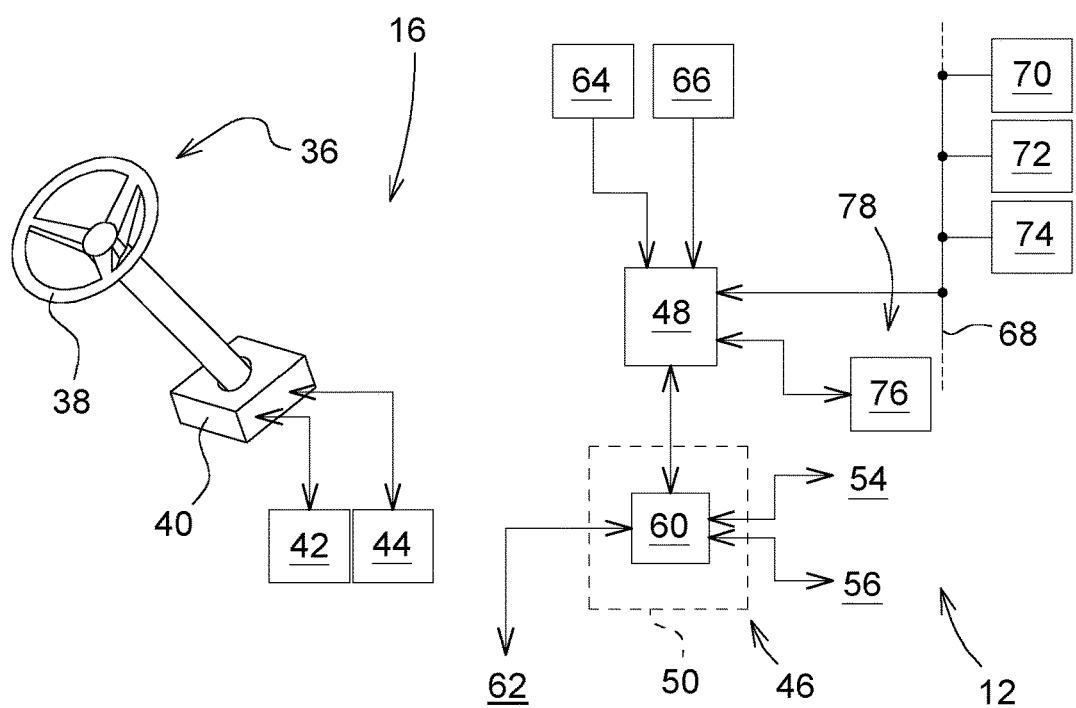

STEERING APPARATUS FOR AN AGRICULTURAL VEHICLE

RELATED APPLICATIONS

This application claims priority to German Patent Application Ser. No. 102019204674.6, filed Apr. 2, 2019, the disclosure of which is hereby incorporated by reference in its entirety.

FIELD OF THE DISCLOSURE

The present disclosure relates to a steering apparatus for an agricultural vehicle having a vehicle axle suspended in an oscillating or resilient manner, and an actuating apparatus for influencing on the part of the driver a steering angle which is adjustable on the steerable wheels of the vehicle axle.

BACKGROUND

Depending on the deflection of an oscillating movement or deflection movement arising on the vehicle axle as a result of travel, when steerable wheels of an agricultural vehicle are steered it may lead to undesired contact between the assigned vehicle tires and the surrounding bodywork components of the vehicle. In the case of an agricultural vehicle configured as an agricultural tractor, this primarily relates to an engine hood adjacent to the steerable front wheels. Depending on the steering angle, the engine hood may be significantly damaged in the event of a collision with the rotating front wheels. Therefore, there is a need for a steering apparatus which is adapted to the circumstances of a vehicle axle which is mounted in an oscillating or resilient manner.

SUMMARY

In the present disclosure, a steering apparatus for an agricultural vehicle includes a vehicle axle, which is suspended in an oscillating or resilient manner, and an actuating apparatus for influencing on the part of the driver a steering angle which is adjustable on the steerable wheels of the vehicle axle. According to the present disclosure, a mechanism is present for the active limitation of an oscillating angle or deflection path arising on the vehicle axle, the mechanism activating a control unit according to a full steering angle to be anticipated on the steerable wheels as a result of travel.

In this case, a full steering angle is understood as a maximum steering angle which may be produced on the steerable wheels. This corresponds to a minimum possible turning circle of the relevant agricultural vehicle.

By the corresponding limitation of the oscillating angle or deflection path, the possibility of undesired contact between the vehicle tires and the surrounding bodywork components of the agricultural vehicle may be eliminated when steering. The mechanism for the active limitation may be an electrical or hydraulic positioning element, the maximum permitted oscillating angle or deflection path being able to be adapted thereby by acting on a hydraulic suspension apparatus, or the like, which is assigned to the vehicle axle.

The agricultural vehicle, for example, may be an agricultural tractor with a front axle which is suspended so as to oscillate about a vehicle longitudinal axis and at the same time so as to be resilient along a vehicle vertical axis, steerable front wheels being located on the front ends thereof. The steering of the front wheels is typically carried out by a steering handle in the form of a steering wheel which is located in a driver's cab and which is a component of the actuating apparatus cooperating with the steerable front wheels.

Undesired contact of the steerable wheels with the surrounding bodywork components of the agricultural vehicle may be eliminated, in particular, when the active limitation is carried out such that the maximum permitted oscillating angle or deflection path is additionally reduced relative to structurally fixedly predetermined end stops.

A full steering angle is typically to be anticipated in connection with turning maneuvers or parking maneuvers of the agricultural vehicle. Thus it is advantageous if the activation of the mechanism, in the sense of an active limitation of the oscillating angle or deflection path on the part of the control unit, is carried out when the control unit extrapolates the imminent execution of a turning maneuver or parking maneuver on the basis of characteristic evidence.

Such characteristic evidence is obtained, amongst other things, on the basis of travel path data, compared with the current vehicle position, of the operating state of a headland management system, characteristic steering movements on a steering handle provided for influencing the steering angle or a characteristic vehicle speed. The travel path data may in this case contain field edge data documented cartographically, including the path of an associated headland.

Thus, the execution of a turning maneuver is able to be predicted as imminent when, on the basis of the operating state of the headland management system or the current vehicle position, imminent travel through the headland in the field edge region may be extrapolated therefrom.

On the other hand, a stoppage in the farmyard may be extrapolated in an equally simple manner from the current vehicle position, wherein depending on the travel speed and steering movements information is obtained about a parking or loading operation executed there by a front loader or the like. Thus, in such a case comparably low travel speeds in the region of a few kilometers per hour, in combination with pronounced steering angles and frequent changes in the direction of travel, are typical.

Apart from an automatic limitation undertaken in such a manner, there is also the possibility that the activation of the mechanism, in the sense of an active limitation of the oscillating angle or deflection path on the part of the control unit, is carried out when the control unit establishes the presence of a user instruction expressed via an input unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

The FIGURE shows a schematically reproduced embodiment of a steering apparatus of an agricultural vehicle configured as an agricultural tractor (not explicitly shown).

Corresponding reference numerals are used to indicate corresponding parts in the FIGURE.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The steering apparatus 12, which is provided as a component of the agricultural tractor 10, comprises a vehicle axle 14, which is suspended in an oscillating or resilient manner, and an actuating apparatus 16 for influencing on the part of the driver a steering angle δ which is adjustable on the steerable wheels 18, 20 of the vehicle axle 14. More specifically, the vehicle axle 14 is configured as a front axle 26 which is suspended in an oscillating manner about a vehicle longitudinal axis 22, and at the same time in a resilient manner along a vehicle vertical axis 24, steerable front wheels 28, 30 with associated front tires 32, 34 being located on the front ends thereof. The steering of the front wheels 28, 30 is carried out by a steering handle 36 in the form of a steering wheel 38 which is located in a driver's cab and which is a component of the actuating apparatus 16 cooperating with the steerable front wheels 28, 30. In this case, the actuating apparatus 16 also comprises an orbitrol steering unit 40 which is connected to the steering wheel 38 and which serves for actuating associated steering cylinders 42, 44 for altering the steering angle δ on the steerable front wheels 28, 30.

Moreover, one or more mechanisms or devices 46 is present for the active limitation of an oscillating angle α or deflection path s arising on the front axle 26, the mechanism or device activating a microprocessor-controlled control unit 48, according to a full steering angle E to be anticipated on the steerable front wheels 28, 30 as a result of travel.

The one or more mechanisms or devices 46 for active limitation are an electrical positioning element 50, the maximum permitted oscillating angle $α_{max}$ or deflection path $s_{max}$ being able to be adapted thereby, by acting on a hydraulic suspension apparatus 52 assigned to the front axle 26. The suspension apparatus 52 in the present case is exemplified by hydraulic suspension struts 54, 56, the front axle 26 being suspended thereon relative to a load-bearing vehicle structure 58. The electrical positioning element 50 is designed for limiting the oscillating angle α or deflection path s as an electromechanical control valve arrangement 60, a hydraulic oil flow between associated working chambers of the suspension struts 54, 56 and a hydraulic system 62 being able to be interrupted by actuating the control unit 48, in the sense of a blocking of the suspension struts 54, 56, when a maximum permitted oscillating angle $α_{max}$ or deflection path $s_{max}$ is reached.

By a corresponding limitation of the oscillating angle α or deflection path s, the possibility of undesired contact between the front tires 32, 34 and the surrounding bodywork components of the agricultural tractor 10 may be eliminated when steering. This is the case, in particular, when the active limitation is carried out such that the maximum permitted oscillating angle $α_{max}$ or deflection path $s_{max}$ is additionally reduced relative to structurally fixedly predetermined end stops.

A full steering angle $δ_{max}$ is typically to be anticipated in connection with turning maneuvers or parking maneuvers of the agricultural tractor 10. Accordingly, the activation of the positioning element 50, in the sense of an active limitation of the oscillating angle α or deflection path s on the part of the control unit 48, is carried out when the control unit 48 extrapolates the imminent execution of a turning maneuver or parking maneuver on the basis of characteristic evidence.

In order to assess whether characteristic evidence for the imminent execution of a turning maneuver or parking maneuver is present, the control unit 48 is connected to a satellite-assisted navigation system 64 for providing a current vehicle position, a cartographic memory 66 with travel path data, and a CAN-bus 68. Data relating to the wheel rotational speeds detected by associated wheel rotational speed sensors 70, from steering movements which are performed on the steering wheel 38 and which are detected by a steering angle sensor 72, as well as the operating state of a headland management system 74 are applied to the CAN bus 68. The control unit 48 in turn extrapolates the travel speed of the agricultural tractor 10 from the wheel rotational speeds. The travel path data contain in this case cartographically documented field edge data including the path of an associated headland.

Thus, the execution of a turning maneuver is able to be predicted as imminent when, on the basis of the operating state of the headland management system 74 or the current vehicle position, imminent travel through the headland in the field edge region may be extrapolated therefrom.

On the other hand, it is also possible to extrapolate a stoppage in the farmyard from the current vehicle position, wherein depending on the travel speed and steering movements, information is obtained about a parking or loading operation executed there by a front loader or the like. Thus, in such a case, comparatively low travel speeds in the region of a few kilometers per hour in combination with pronounced steering angles and frequent changes in the direction of travel are typical.

Apart from an automatic limitation, the activation of the positioning element 50, in the sense of an active limitation of the oscillating angle α or deflection path s on the part of the control unit 48, is also carried out when the control unit establishes the presence of a user instruction expressed via an input unit 76. The input unit 76 may be, for example, a touch-sensitive control and display unit 78.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A steering apparatus for an agricultural vehicle, comprising:
    a vehicle axle suspended in an oscillating and resilient manner;
    one or more steerable wheels located on the vehicle axle;
    a control unit connected to a satellite-assisted navigation system, a cartographic memory, and a CAN bus communicating with a wheel rotational speed sensor, a steering angle sensor, and a headland management system;
    an actuating apparatus for influencing a steering angle which is adjustable on the one or more steerable wheels;
    a suspension strut connected between the vehicle axle and a vehicle structure of the agricultural vehicle; and
    a control valve hydraulically connected between the suspension strut and a hydraulic system for actively limiting one or more of an oscillating angle about a vehicle longitudinal axis and a deflection path along a vehicle vertical axis of the vehicle axle;

wherein the control valve reduces one or more of the oscillating angle and the deflection path by reducing a hydraulic flow between the suspension strut and the hydraulic system when the control unit anticipates a full steering angle by extrapolating an imminent execution of one or more of a turning maneuver and a parking maneuver based on characteristic evidence;

wherein the control unit extrapolates the imminent execution of the parking maneuver based on travel speed, steering angles, and changes in direction.

2. The steering apparatus of claim 1, wherein the control unit predicts the imminent execution of the turning maneuver based on determining travel through a headland in a field edge region.

3. The steering apparatus of claim 1, wherein the control unit reduces the oscillating angle or deflection path based on a user input providing an instruction to an input unit connected to the control unit.

4. The steering apparatus of claim 1, wherein the control valve reduces the oscillating angle and the deflection path when the control unit anticipates a full steering angle.

5. An agricultural vehicle, comprising:
a vehicle axle suspended in an oscillating and resilient manner;
one or more steerable wheels located on the vehicle axle;
a control unit connected to a satellite-assisted navigation system, a cartographic memory, and a CAN bus communicating with a wheel rotational speed sensor, a steering angle sensor, and a headland management system;
an actuating apparatus for influencing a steering angle which is adjustable on the one or more steerable wheels;
a suspension strut connected between the vehicle axle and a vehicle structure of the agricultural vehicle; and
a control valve hydraulically connected between the suspension strut and a hydraulic system for actively limiting one or more of an oscillating angle about a vehicle longitudinal axis and a deflection path along a vehicle vertical axis of the vehicle axle;
wherein the control valve reduces one or more of the oscillating angle and the deflection path by reducing a hydraulic flow between the hydraulic suspension strut and the hydraulic system when the control unit anticipates a full steering angle by extrapolating an imminent execution of one or more of a turning maneuver and a parking maneuver based on characteristic evidence;
wherein the control unit extrapolates the imminent execution of the parking maneuver based on travel speed, steering angles, and changes in direction.

6. The agricultural vehicle of claim 5, wherein the control unit predicts the imminent execution of the turning maneuver based on determining travel through a headland in a field edge region.

7. The agricultural vehicle of claim 5, wherein the control unit reduces the oscillating angle or deflection path based on a user input providing an instruction to an input unit connected to the control unit.

8. The agricultural vehicle of claim 5, wherein the control valve reduces the oscillating angle and the deflection path when the control unit anticipates a full steering angle.

9. A steering apparatus for an agricultural vehicle, comprising:
a vehicle axle suspended in an oscillating and resilient manner;
one or more steerable wheels located on the vehicle axle;
a control unit connected to a satellite-assisted navigation system, a cartographic memory, and a CAN bus communicating with a wheel rotational speed sensor, a steering angle sensor, and a headland management system;
an actuating apparatus for influencing a steering angle which is adjustable on the one or more steerable wheels; and
a control valve for actively limiting one or more of an oscillating angle about a vehicle longitudinal axis and a deflection path along a vehicle vertical axis of the vehicle axle;
wherein the control valve reduces one or more of the oscillating angle and the deflection path when the control unit anticipates a full steering angle by extrapolating an imminent execution of one or more of a turning maneuver and a parking maneuver based on characteristic evidence;
wherein the control unit extrapolates the imminent execution of the parking maneuver based on travel speed, steering angles, and changes in direction.

10. The steering apparatus of claim 9, wherein the control unit predicts the imminent execution of the turning maneuver based on determining travel through a headland in a field edge region.

11. The steering apparatus of claim 9, wherein the control unit reduces the oscillating angle or deflection path based on a user input providing an instruction to an input unit connected to the control unit.

12. The steering apparatus of claim 9, wherein the control valve reduces the oscillating angle and the deflection path when the control unit anticipates a full steering angle.

* * * * *